(12) United States Patent
Winzell et al.

(10) Patent No.: US 10,430,932 B2
(45) Date of Patent: Oct. 1, 2019

(54) METHOD AND AN ARRANGEMENT FOR PSEUDO COLORING OF A DIGITAL IMAGE

(71) Applicant: Axis AB, Lund (SE)

(72) Inventors: Thomas Winzell, Lund (SE); Emanuel Johansson, Lund (SE)

(73) Assignee: Axis AB, Lund (SE)

( * ) Notice: Subject to any disclaimer, the term of this patent is extended or adjusted under 35 U.S.C. 154(b) by 137 days.

(21) Appl. No.: 15/706,049

(22) Filed: Sep. 15, 2017

(65) Prior Publication Data

US 2018/0075589 A1 Mar. 15, 2018

(30) Foreign Application Priority Data

Sep. 15, 2016 (EP) ..................................... 16188889

(51) Int. Cl.
*G06T 5/40* (2006.01)
*G06T 5/00* (2006.01)
*G06T 11/00* (2006.01)

(52) U.S. Cl.
CPC ................ *G06T 5/40* (2013.01); *G06T 5/001* (2013.01); *G06T 11/001* (2013.01); *G06T 2207/10024* (2013.01)

(58) Field of Classification Search
None
See application file for complete search history.

(56) References Cited

U.S. PATENT DOCUMENTS

| 6,641,536 | B2 * | 11/2003 | Hossack | G01S 7/52034 600/443 |
| 7,683,950 | B2 * | 3/2010 | Kelly | H04N 1/58 348/252 |
| 7,840,066 | B1 * | 11/2010 | Chen | G06T 5/002 382/168 |
| 8,103,097 | B2 * | 1/2012 | Finlayson | G06T 5/009 345/596 |
| 2005/0187478 | A1 * | 8/2005 | Beaudry | A61B 5/0091 600/476 |

(Continued)

FOREIGN PATENT DOCUMENTS

| CN | 103489168 A | 1/2014 |
| CN | 104217407 A | 12/2014 |

(Continued)

OTHER PUBLICATIONS

Forrest, A. K. "Colour histogram equalisation of multichannel images." IEE Proceedings-Vision, Image and Signal Processing 152.6 (2005): 677-686. (Year: 2005).*

(Continued)

*Primary Examiner* — Michelle M Entezari
(74) *Attorney, Agent, or Firm* — Volpe and Koenig, P.C.

(57) ABSTRACT

A method for pseudo coloring of a digital single-channel image is disclosed. The method comprises acquiring a single-channel image having an intensity distribution, forming a first channel of a multi-channel image by performing a first histogram equalization of the intensity distribution, forming a second channel of the multi-channel image by performing a second, different, histogram equalization of the intensity distribution, wherein the first channel and the second channel of the multi-channel image represent different components of a color model. An arrangement for (Continued)

providing a pseudo coloring of a digital single-channel image is also disclosed, and a monitoring thermal camera system comprising such an arrangement.

14 Claims, 4 Drawing Sheets

(56) References Cited

U.S. PATENT DOCUMENTS

| | | | |
|---|---|---|---|
| 2005/0226496 A1 | 10/2005 | Finlayson | |
| 2007/0110303 A1* | 5/2007 | Bhattacharjya | G09G 3/2003 382/166 |
| 2010/0080448 A1* | 4/2010 | Tam | H04N 13/261 382/154 |
| 2010/0284626 A1* | 11/2010 | Malm | G06T 5/002 382/261 |
| 2010/0309315 A1* | 12/2010 | Hogasten | H04N 5/33 348/164 |
| 2012/0275700 A1 | 11/2012 | Stern et al. | |
| 2015/0187070 A1* | 7/2015 | Cheng | G06T 7/11 382/128 |
| 2015/0187144 A1* | 7/2015 | Roth | G06T 19/006 345/633 |
| 2015/0296146 A1* | 10/2015 | Scanlon | H04N 5/247 348/82 |
| 2015/0358560 A1* | 12/2015 | Boulanger | H04N 5/332 348/164 |
| 2019/0066254 A1* | 2/2019 | Tung | G06T 1/00 |

FOREIGN PATENT DOCUMENTS

| | | |
|---|---|---|
| CN | 104240206 A | 12/2014 |
| JP | 06-311517 A | 11/1994 |
| WO | 2009/081394 A1 | 7/2009 |

OTHER PUBLICATIONS

Pitas, Ioannis, and P. Kiniklis. "Multichannel techniques in color image enhancement and modeling." IEEE Transactions on Image Processing 5.1 (1996): 168-171. (Year: 1996).*

Thakur, V., and Neeta Tripathi. "On the way towards efficient enhancement of multi-channel underwater images." International Journal of Applied Engineering Research 5.5 (2010): 895-903. (Year: 2010).*

Taguchi, Akira, and Yoshinori Ikeda. "Enhancement of multichannel signals by histogram modification." 2000 10th European Signal Processing Conference. IEEE, 2000. (Year: 2000).*

"Frequency Domain Pseudo-color to Enhance Ultrasound Images", Afruz et al.; ccsenet.org/cis; Computer and Information Science, vol. 3, No. 4; Nov. 2010 (ISSN 1913-8989; ISSN 1913-8997) p. 24-34.

"A Novel Filtered Bi-Histogram Equalization Method", Sengee et al., Journal of Korea Multimedia Society, vol. 18, No. 6, Jun. 2015; p. 691-700.

"Review of Histogram Equalization Methods for Contrast Enhancement", Archana Chaudhari, International Journal of Computer Applications (0755-8887); International Conference on Computer Technology (ICCT 2015) p. 20-24.

"The Implementation of thermal image visualization by HDL based on pseudo-color", Zhu et al., Applications of Digital Image Processing XXVII, Proceedings of SPIE vol. 5558, SPIE, Bellingham, WA, 2004, p. 727-734.

"Study of the pseudo-color processing for infrared forest-tire image", Wang et al., 978-1-4244-5824/0; 2010 IEEE; 2nd International Conference on Future Computer and Communication, vol. 1, V1-415-418.

EP 16188889.6 Search Report/Uppdragshuset (dated May 12, 2016). Japanese Office Action dated Nov. 13, 2018 for the Japanese Patent Application No. 2017-164019.

* cited by examiner

US 10,430,932 B2

METHOD AND AN ARRANGEMENT FOR PSEUDO COLORING OF A DIGITAL IMAGE

FIELD OF INVENTION

A method for pseudo coloring of a digital image, in particular a digital singe channel image is disclosed. An arrangement for providing a pseudo coloring of such an image is also disclosed.

BACKGROUND

In some imaging techniques, such as thermal imaging, radar, X-ray imaging, and ultrasound imaging, the acquired image is represented by a single-channel image. That is, an image carrying only intensity information. The image has thus only one channel, comprising intensity information, and may be presented as a grayscale image. However, various image processing techniques may be applied to the acquired image for enhancing different image parameters or for improving the presentation of the image.

For example, a histogram equalization may be applied on the single-channel image. Different histogram equalizations may have different purposes, for example enhancement of the image contrast or reduction of background noise in a particular part of the image. Many different types of histogram equalizations are known, such as plateau histogram equalizations, adaptive histogram equalizations, and high/low cut-off histogram equalizations. The paper "Review of Histogram Equalization Methods for Contrast Enhancement" (Chaudhari et al) discusses some of these histogram equalization methods. A known drawback with the use of histogram equalizations is that information in the single-channel image may be lost. For example, by applying a histogram equalization comprising a cut-off of a group of intensity values in a single-channel image, the information provided by the pixels having these intensity values may be lost.

Another example of an image processing technique is pseudo coloring, or palette which the technique also may be called. Each intensity value in the single-channel image is mapped to a color according to a table or function. The purpose of pseudo coloring is to present the single-channel image by colors instead of by grayscale, since it is easier for the human eye to identify a difference between different colors than between different shades of gray. Pseudo coloring is typically applied on the single-channel image at the end of the image processing process with a direct mapping of for example an 8-bit intensity data to an 8-bit color map, resulting in 255 different colors.

Different types of pseudo coloring are known. As an example, the paper "Frequency Domain Pseudo-color to Enhance Ultrasound Images" (Afruz et al) discloses pseudo-coloring based on frequency domain to visually enhance an image.

Even though much effort has been put to improve the image processing of single-channel images, there still exists a need for improvement within this field.

SUMMARY

A method and an arrangement for pseudo coloring of a digital single-channel image that is improved in view of known methods are disclosed. It is a particular object of the disclosure to provide a method with an increased number of pseudo colors, i.e. an increased color depth, for presenting an image acquired as a single-channel image. A further object of the disclosure is to provide a method that may utilize the advantages of histogram equalization for single-channel images without loss of information in the image, or at least with lower loss when compared to known techniques.

According to a first aspect, the above and further objects that will be evident from the following description are achieved by a method for pseudo coloring of a digital single-channel image. The method comprises acquiring a single-channel image having an intensity distribution, forming a first channel of a multi-channel image by performing a first histogram equalization of the intensity distribution, forming a second channel of the multi-channel image by performing a second, different, histogram equalization of the intensity distribution, wherein the first channel and the second channel of the multi-channel image represent different components of a color model.

The method thus transforms a single-channel image to a multi-channel image and applies a histogram equalization on each created channel. Instead of mapping a single-channel image to a color map, each of the channels of a multi-channel image is mapped to a component of a color model. Thus a higher color depth may be achieved when compared to known pseudo coloring. Moreover, by transforming the single-channel image into a multi-channel image and applying pseudo coloring to each channel, different histogram equalizations, may be applied to each channel with a much lower relative loss of color depth. Another advantage gained by the method is that since a histogram equalization is applied to one of multiple channels, instead of to a sole channel, portions of the intensity distribution may for example be cut off from that channel but the information provided by the corresponding pixels may be kept by that they are present in the other channels. Information is for example provided by the contrast between the pixels having different intensity values. Hence, an image processing method providing a pseudo coloring of an image with a higher color depth and enabling the advantages of histogram equalizations without losing information, or with at least a lower loss of information, in the image is provided.

By intensity distribution is meant, in the context of this application, the distribution of intensity values in a single-channel image. The intensity distribution comprises information on the number of pixels of each possible intensity value. The number of possible intensity values depends on the size of the single-channel image. A 12-bit single-channel image can have an intensity distribution with $2^{12}=4096$ possible intensity values.

By color model is meant, in the context of this application, the mathematical model for describing the way colors can be represented as tuples of components, for examples triples in RGB. When connecting/mapping the color model to a color space, being a specific organizations of colors that defines how the components are to be interpreted, an absolute color space is provided. It is noted that the terms color model and color space may in some fields be used as alternative terms. The term color model may of course be substituted with the term color space, or any other term, if that term is given the same definition as provided above for the term color model.

The method may further comprise forming a third channel of the multi-channel image by performing a third histogram equalization of the intensity distribution. The third channel may represent a component of the color model, preferably a different component of the color model than the components represented by the first and second channels.

The third channel provides the possibility of an even higher color depth in the resulting three channel image.

One of the histogram equalizations may comprise cutting off a first portion of the intensity distribution. Another one of the histogram equalizations may comprise cutting off a second portion of the intensity distribution. A combination of these histogram equalizations provides cutting off different portions of the intensity distribution.

At least one of the histogram equalizations may comprise cutting off an upper portion or a lower portion of the intensity distribution. The upper portion or the lower portion that is cut off may correspond to 0.5-1% of the total number of pixels in the single-channel image.

It may desirable to cut off an upper portion and/or a lower portion of the intensity distribution with the purpose of removing noise, removing background, or to enhance the contrast in the remaining portions that are considered interesting.

At least one of the histogram equalizations may comprise cutting off an upper portion and a lower portion of the intensity distribution. Each of the upper portion and the lower portion may correspond to 1-2% of the total number of pixels in the single-channel image.

It may desirable to cut off both a lower portion and an upper portion of the intensity distribution for reducing noise and/or for increasing the contrast of the central interval of the intensity distribution which typically represents the interesting parts of the image.

At least one of the histogram equalizations may comprise an adaptive histogram equalization and/or a plateau histogram equalization. These are non-limiting examples of histogram equalizations that may be applied. The skilled person realizes that different types of histogram equalizations may be applied depending on application and that the specific type of histogram equalization is not essential for the general inventive concept.

The color model may be one of the RGB color model, the CMYK color model, the HSV color model, and the HSL color model. The skilled person realizes that different types of color models are applicable and that the specific type of color model is not essential for the general inventive concept.

The method may further comprise reducing the size of each channel of the multi-channel image before transmittal over a network. Thus, the pseudo coloring, with applied histogram equalizations, are performed before scaling the resulting image. By applying the inventive pseudo coloring method, wherein a single-channel image is converted to a multi-channel image, before scaling, a larger color depth may be achieved.

The single-channel image may be a thermal image, a radar image, an X-ray image or an ultrasound image. The method is thus applicable within a wide range of imaging techniques. The above listed image types constitute non-limiting examples.

According to a second aspect, the above and further objects are achieved by an arrangement for providing a pseudo coloring of a digital single-channel image. The arrangement comprises an image acquiring unit arranged to acquire a single-channel image having an intensity distribution, and an image processing unit arranged to: form a first channel of a multi-channel image by performing a first histogram equalization of the intensity distribution, and form a second channel of the multi-channel image by performing a second, different, histogram equalization of the intensity distribution, wherein the first channel and the second channel of the multi-channel image represent different components of a color model.

The above features and advantages disclosed in connection to the first aspect apply also to this second aspect. To avoid undue repletion, reference is made to the above.

The arrangement may further comprise a scaling unit arranged to reduce the size of each of the channels of the multi-channel image before transmittal over a network.

According to a third aspect, the above and further objects are achieved by a monitoring thermal camera system comprising the arrangement according to an embodiment of the second aspect.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above disclosed and other aspects of the present invention will now be described in more detail, with reference to the appended drawings showing embodiments.

It is noted that that the figures may be not to scale for purposes of clarity.

DETAILED DESCRIPTION

The present invention will now be described more fully with reference to the accompanying drawings, in which embodiments are shown. The invention may however be embodied in many different forms and should not be construed as limited to the embodiments set forth herein.

Figure 1:
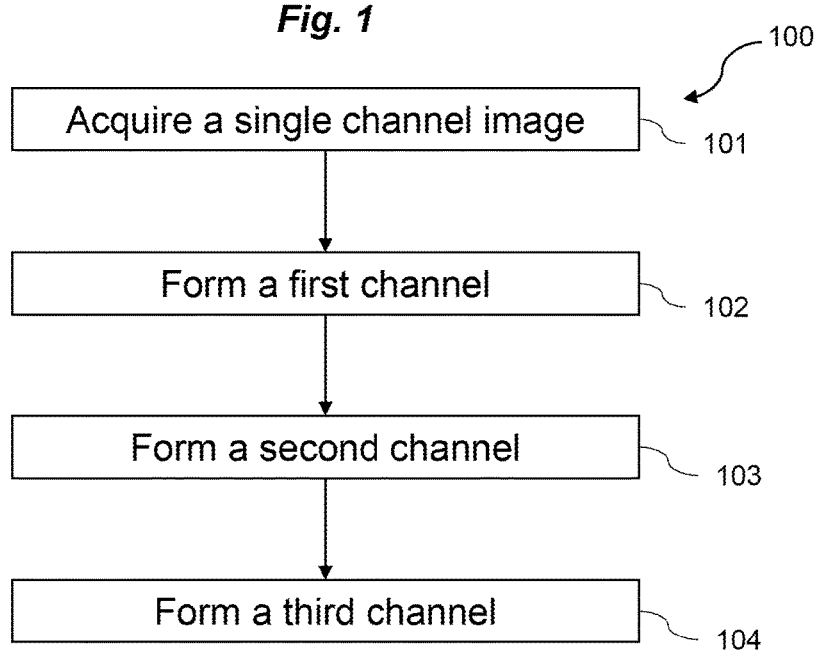
FIG. 1 illustrates a method for pseudo coloring of a digital single-channel image.

FIG. 1 illustrates a method 100 for achieving a pseudo coloring of a digital single-channel image. First, a single-channel image is acquired 101. The single-channel image is digital and may be acquired by a wide range of image acquiring devices/systems such as a thermal camera, a radar system, an ultrasound system, or an X-ray apparatus.

By single-channel image is meant an image that contains only intensity information in one channel. The resolution of the image, i.e. the possible number of different intensity values in the single-channel image, is restricted by the size of the image. For example, an 8-bit single-channel image can have a resolution of $2^8$=256 different intensity values. An intensity image may for example be represented by a grayscale image, where different intensities of the image pixels are represented by different gray tones. An 8-bit single-channel image may thus be presented by a grayscale image using 256 different gray tones, each representing a different intensity value. The color depth of the single-channel image is in this case 256. Since the human eye is better at differentiating different colors than different tones of gray, a pseudo coloring may instead be applied. In that case, different colors or color tones are mapped to different intensity values. Still, the color resolution is restricted to 256 different colors or color tones.

In order to enhance one or more areas in a single-channel image, a histogram equalization may be applied. For example, the contrast of an area in the single-channel image may be enhanced by performing a histogram equalization that spreads out the most interesting intensity value intervals and suppresses the non-interesting intervals. Histogram equalization as such is a well-known technique for application on a single-channel image. However, with histogram equalization the color depth, i.e. the number of different tones used in a representation of the image, is typically reduced due to the suppressing of intensity values.

There exists the need to improve the representation of the acquired single-channel image. A higher resolution, and thus higher color depth, is desired while still being able to utilize the advantages of the histogram equalization technique.

For that purpose, the method 100 comprises an operation of forming a first channel 102, and forming a second channel 103. The operation of forming the first channel 102 comprises performing a first histogram equalization of the intensity distribution of the acquired single-channel image. The operation of forming the second channel 103 comprises performing a second histogram equalization of the intensity distribution. The second histogram equalization is different from the first histogram equalization.

A new image is thus formed that is a double-channel image. The first channel is represented by the result of the first histogram equalization and the second channel is represented by the result of the second histogram equalization. Each of these channels may be connected/mapped to a component of a color model wherein the channel represents that component. Non-limiting examples of color models are the RGB (red, green blue) color mode, the CMYK (cyan, magenta, yellow, key) color model, the HSV (hue, saturation, value) color model, and the HSL (hue, saturation, lightness/luminosity) color model (also known as the HLS color model). In case a color model having more than two components is used, for example the RGB color model, one of the first channel and the second channel may represent two of the components. For example, the first channel may represent the red component and the second channel may represent the green and the blue components. In that case, the image would be transformed into a three channel image by forming a third channel comprising a copy of the second channel.

By the method 100, the acquired single-channel image is transformed from an intensity image having a lower color depth to a color image having a higher color depth. Moreover, characteristics, such as contrast, of the single-channel image may be enhanced by the applied histogram equalizations. The different histogram equalizations may be directed to different types of improvements which will be explained in more detail in connection to other figures.

Optionally, the method 100 further comprises an operation of forming a third channel by performing a third histogram equalization of the intensity distribution. The third histogram equalization may be different from the first histogram equalization and from the second histogram equalization.

In a similar manner, further channels may be formed. For example, a fourth channel may be formed by performing a fourth histogram equalization of the intensity distribution. The fourth histogram equalization may represent a component of a color model, the component being different from the components represented by the other (first, second, and third) channels.

Figure 2:
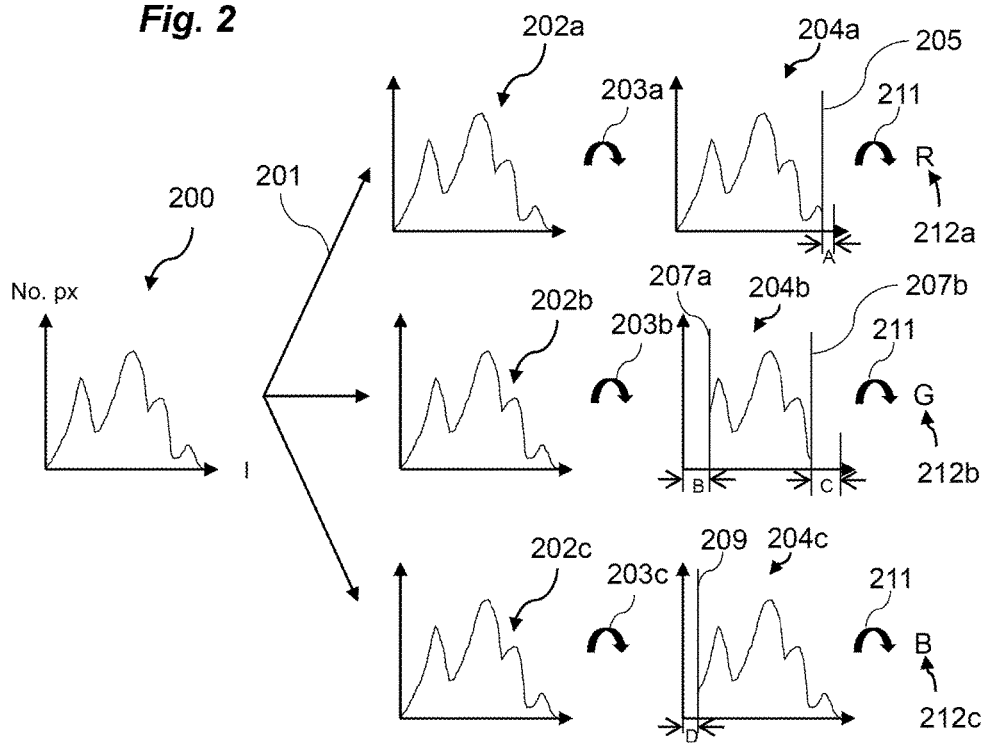
FIG. 2 illustrates operations of the method as performed on an intensity distribution of the image.

FIG. 2 illustrates the method 100 being applied to an intensity distribution 200 of an acquired single-channel image. The intensity distribution 200 is presented as an intensity curve in a X/Y diagram where the X axis represents the intensity value and the Y axis represents number of pixels of each intensity value. The format and shape of the curve are here provided as an example for illustrative purposes.

Three channels of a multi-channel image are created 201 by providing a first, second, and third intensity distribution clone 202a, 202b, 202c, based on the intensity distribution 200. Each of the intensity distribution clones 202a, 202b, 202c are subjected to a histogram modification function 203a, 203b, 203c to provide resulting first, second, and third modified intensity distributions 204a, 204b, 204c. The histogram modification function defines how an intensity distribution is to be modified before applying a histogram equalization function 211 that redistributes the modified intensity distributions 204a, 204b, 204c for increasing the contrast between the corresponding pixels. The histogram modification functions 203a, 203b, 203c and the histogram equalization function 211 are parts of performing a histogram equalization. Both the histogram modification functions and the histogram equalization functions are known as such, however these are discussed separately here to illustrate the function of the histogram modification functions in more detail.

The first histogram modification function 203a comprises performing a cut-off 205 of an upper portion of the first intensity distribution clone 202a, which is illustrated in the resulting first modified intensity distribution 204a. The upper portion corresponds to an intensity interval A. The intensity interval A may correspond to 0.5-1% of the total number of pixels in the single-channel image.

The second histogram modification function 203b comprises performing a cut-off 207a of a lower portion of the second intensity distribution clone 202b, and further comprises performing a cut-off 207b of an upper portion of the second intensity distribution clone 202b, which is illustrated in the resulting second modified intensity distribution 204b. The lower portion corresponds to an intensity interval B and the upper portion corresponds to an intensity interval C. Each of the intensity intervals B and C may correspond to 1-2% of the total number of pixels in the single-channel image. They do not need to correspond to the same percentage value.

The third histogram modification function 203c comprises performing a cut-off 209 of a lower portion of the first intensity distribution clone 202c, which is illustrated in the resulting third modified intensity distribution 204c. The lower portion corresponds to an intensity interval D. The intensity interval D may correspond to 0.5-1% of the total number of pixels in the single-channel image.

The result of the performed histogram modification functions 203a, 203b, 203c, i.e. the first, second, and third modified intensity distributions 204a, 204b, 204c, are thereafter subjected to the histogram equalization function 211. The result of the histogram equalization function 211 on each channel is mapped to a different component of a color model, in this example the RGB color model.

Thus, the first channel is formed by performing a first histogram equalization on the first intensity distribution clone 202a, including applying the first histogram modification function 203a and applying the histogram equalization function 211, and is set to represent to the R (red) component 212a. The second channel is formed by performing a second histogram equalization on the second intensity distribution clone 202b, including applying the second histogram modification function 203b and applying the histogram equalization function 211, and is set to represent the G (green) component 212b. The third channel is formed by performing a third histogram equalization on the third intensity distribution clone 202c, including applying the third histogram modification function 203c and applying the histogram equalization function 211, and is set to represent the B (blue) component 212c.

The overall result is a multi-channel image mapped to the RGB color model. By the applied method, the color depth is increased. For example, an 8-bit single-channel image providing the possibility of 256 ($2^8$) colors/color tones has been transformed to an 8-bit three-channel image providing the possibility of over 16 million colors/color tones ($2^{8*3}$).

Many modifications may be made to the process illustrated in FIG. 2. For example, several histogram modification functions may be applied to an intensity distribution clone when performing a histogram equalization. Histogram modification functions may be applied in series or simultaneously. Thus, performing a histogram equalization should be construed as not being limited to comprising a single histogram modification function. The histogram equalization may comprise additional other functions than the ones exemplified here. Moreover, other image processing operations may be applied within the disclosed method of pseudo coloring. For example, before applying a histogram equalization, the channels may be subjected to for example scaling or sharpening processes.

The histogram modification functions disclosed in connection to FIG. 2 constitute non-limiting examples of histogram modification functions that may be performed. Further non-limiting examples will be disclosed in connection to FIGS. 3a and 3b. The type of histogram equalization, histogram modification function, or histogram equalization function that is performed, is not essential, however some histogram equalizations and functions therein may provide advantages over other depending on the application.

Figure 3A:
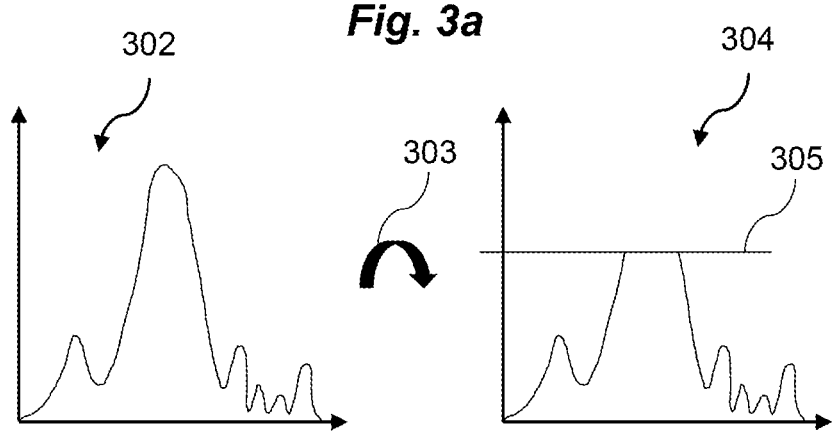
FIG. 3a illustrates a histogram modification function that may be part of a plateau histogram equalization.

FIG. 3a illustrates a histogram modification function 303 which may be applied as part of performing a plateau histogram equalization. The histogram modification function 303 is applied to an intensity distribution 302 and comprises a cut-off 305 of intensity values above a pixel threshold, as illustrated in the resulting modified intensity distribution 304. The modified intensity distribution 304 is thereafter subjected to a histogram equalization function (not illustrated).

A plateau histogram equalization may be useful for enhancing the image contrast for images with an intensity distribution comprising peaks (many pixels) of some intensity values. By performing a plateau histogram equalization, the contrasts between intensity values of lower number of pixels may be enhanced.

Figure 3B:
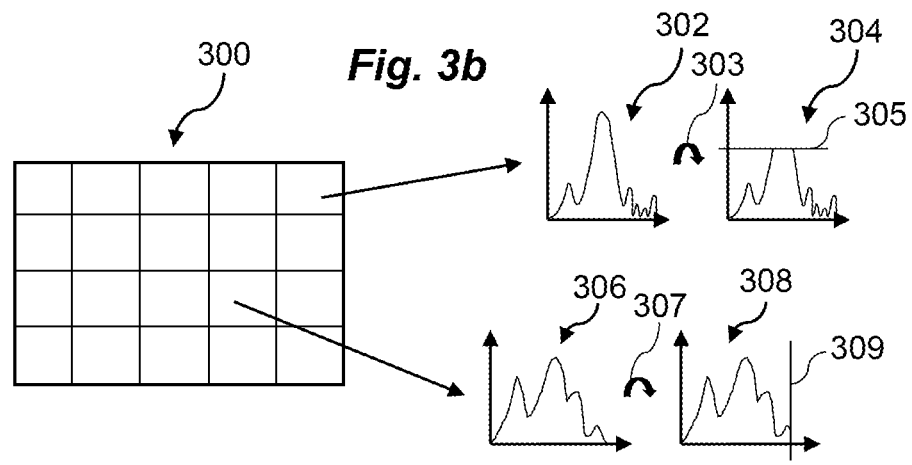
FIG. 3b illustrates a histogram modification function that may be part of an adaptive histogram equalization.

FIG. 3b illustrates histogram modification functions 303, 307 which may be applied as a part of performing an adaptive histogram equalization (AHE) on an image 300. The AHE comprises performing multiple histogram equalizations which may comprise different histogram modification functions and following histogram equalization functions. Each histogram equalization in the AHE is performed on a different section of the image 300. For example, the first histogram modification function 303 is applied to a first intensity distribution 302 of a first section of the image. The first histogram modification function 303 is here the histogram modification function 303 illustrated in FIG. 3a and described above, with a resulting modified intensity distribution 304. The second histogram modification function 307 is applied to a second intensity distribution 306 of a second section of the image. The second histogram equalization function 308 comprises a cut-off 309 of an upper portion of the intensity distribution, which is illustrated in a resulting modified intensity distribution 308. By applying AHE, local contrasts of the image 300 may be enhanced.

Again, the histogram equalizations disclosed herein are provided as non-limiting examples and the examples are chosen for illustrative purposes. Many different variations of the disclosed histogram equalizations, and of other histogram equalizations that are known to the skilled person, may be applied. The histogram equalizations, including the histogram modification functions and the histogram equalization functions, disclosed in this applications are well-known to the skilled person, and will therefore not be disclosed in further detail.

Figure 4A:
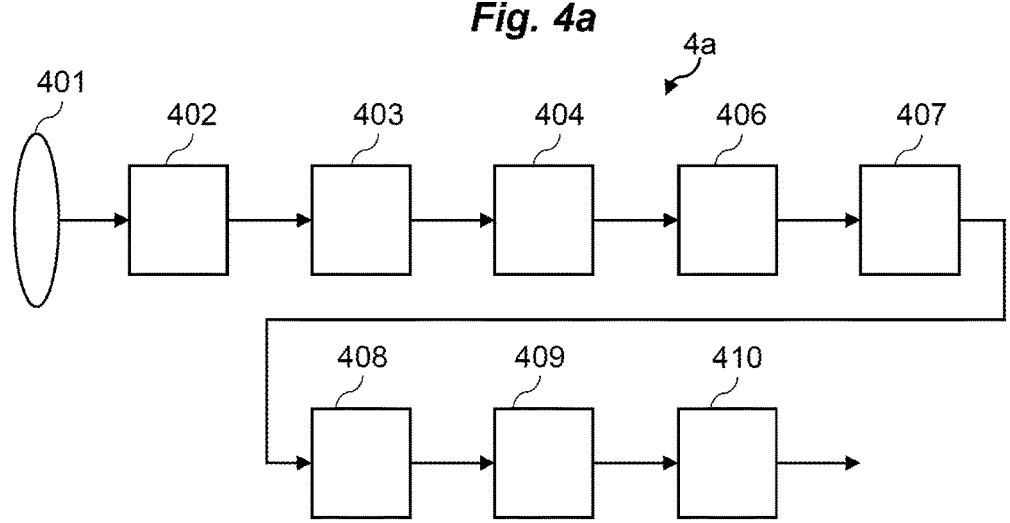
FIG. 4a is a schematic illustration of a known thermal camera system configuration.

A schematic illustration of a thermal camera system 4a configuration is provided in FIG. 4a. FIG. 4a illustrates an example of a known configuration. The thermal camera system 4a comprises optics 401 (including one or more lenses), an image sensor 402, a gain/offset operator 403, a noise reduction operator 404, a histogram operator 406, a local contrast enhancement algorithm operator 407, a sharpening operator 408, a scaler 409 and a palette operator 410. These components are well-known to the skilled person. The process of acquiring and processing a digital single-channel image will now be disclosed. A digital single-channel image is acquired by the image sensor 402 via the optics 401. The single-channel image is processed by the gain/offset operator 403 and by the noise reduction operator 404. Thereafter, the single-channel image is subjected to histogram equalization, local contrast enhancement, and sharpening by the histogram operator 406, the local contrast enhancement algorithm operator 407, and the sharpening operator 408. The single-channel image is thereafter scaled, for example from 12 bits to 8 bits, by the scaler 409 for preparing the image for transmission over a network. Finally, the single-channel image is pseudo colored by applying a palette by the palette operator 410. For an 8-bit single-channel image, the palette may comprise up to 256 color or color tones.

Figure 4B:
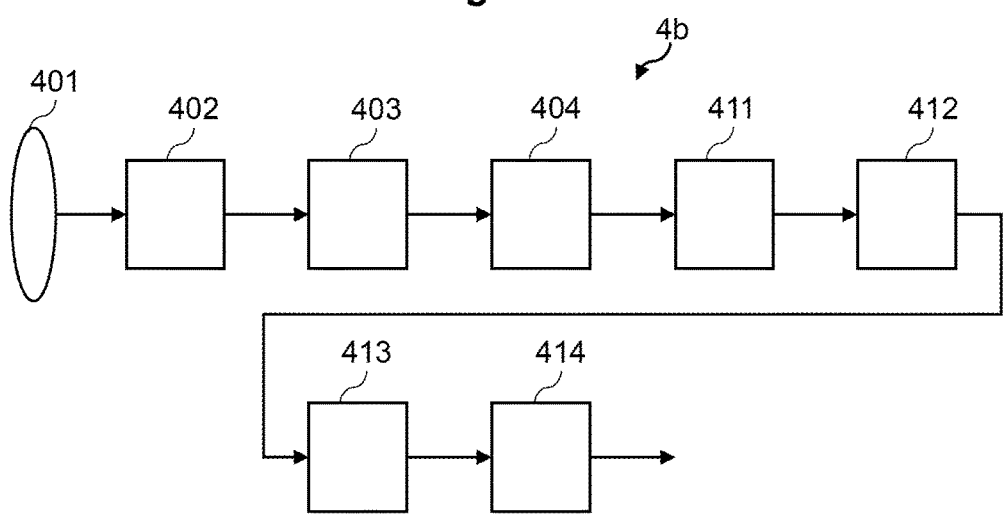
FIG. 4b is a schematic illustration of a thermal camera system configuration in accordance with an embodiment.

FIG. 4b is a schematic illustration of a thermal camera system 4b configuration in accordance with an embodiment. Operators/components that have the same function as corresponding ones in the thermal camera system 4a of FIG. 4a are provided with the same reference numeral. These are the optics 401, the image sensor 402, the gain/offset operator 403, and the noise reduction operator 404. The process of acquiring and processing an image has the same beginning operators as the process disclosed above. That is, a digital single-channel image is acquired by the image sensor 402 via the optics 401. The single-channel image is processed by the gain/offset operator 403 and by the noise reduction operator 404. Thereafter, however, the inventive pseudo coloring method disclosed in this application is applied by a pseudo coloring operator 411. The pseudo coloring operator 411 performs a histogram equalization and a maps the result to a color model wherein each channel of the multi-channel image represents a component of the color model. The input single-channel image is output from the pseudo coloring operator 411 as a multi-channel image being mapping to a color model. The multi-channel image is subjected to contrast enhancement by a local contrast enhancement algorithm operator 412, to sharpening by a sharpening operator 413 and thereafter scaling 414 by a scaler 414. The output from the scaler 414 may for example be an 8-bit multi-channel image with a mapping to an RGB color model.

A difference between the known process, exemplified in FIG. 4a, and the inventive process, exemplified in FIG. 4b, is that the conventional applied palette is replaced with the inventive pseudo coloring method in which a multi-channel image (hence a color image) is created from the acquired single-channel image. Moreover, the inventive pseudo coloring method is performed earlier in the process than the conventional palette.

Specifically, in the known process, the palette (i.e. the pseudo coloring) is performed after the scaling. By applying the palette earlier in the process and on a multi-channel image instead of to a single-channel image, a higher range of colors may be used, thus providing a higher color depth in the resulting image even after the scaling operation.

Typically, the size of the single-channel image is reduced through the process. In the beginning, at the image sensor process 402, the size may be 16 bit. After the noise reduction operator 404, the size may have been reduced to 12 bit, and by the scaler 414 the size may be reduced to 8 bit for being transmitted over a network. By applying the palette on a 12-bit image instead of on an 8-bit image, the number of color/color tones are increased from $2^8=256$ on each channel to $2^{12}=4096$ on each channel. Thus, many more colors or color tones may be applied and thus the color depth of the resulting image may be increased. The above image sizes are provided as examples, however a general conclusion is that by transforming the acquired single-channel image into a multi-channel image early in the image processing, such as before applying a scaling operator, an increased resolution of the image and thus an increased color depth in may be achieved. It is noted that the mapping of each channel of the multi-channel image may be performed in connection to the process of creating the multiple channels or later in the process, such as after the scaling or other operations.

An advantage gained by transforming the single-channel image to a multi-channel image is that the capacity of the operators, for example the local contrast enhancement algorithm operator 412 and the sharpening operator 413, may be more efficiently utilized. These operators typically are designed for multi-channel images. Thus a multi-channel image, as provided as output from the pseudo coloring operator 411, may better suit the functions of the following operators. Hence, there is no need for adapting the operators for working on a single-channel image.

It should be noted that the operators/components are illustrated in FIGS. 4a and 4b as separate units for purpose of clarity and are separated by function and not necessarily by their physical properties. Thus, several of these components may be provided by a single unit. For example, the pseudo coloring operator 411, the local contrast enhancement algorithm operator 412, the sharpening operator 413, and the scaler 414 may be provided on a single computer chip.

It should also be noted that different color models may be used throughout the process. For example, the multi-channel image may be processed in the pseudo coloring operator 411 using one color model, such as RGB, and transformed, for example after sharpening, to another color model, such as CMYK, for output from the processing unit.

Figure 5A:
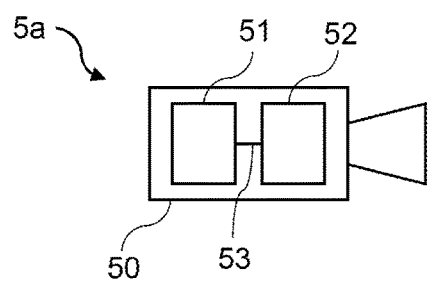
FIG. 5a illustrates a first embodiment of a thermal camera system.
Figure 5B:
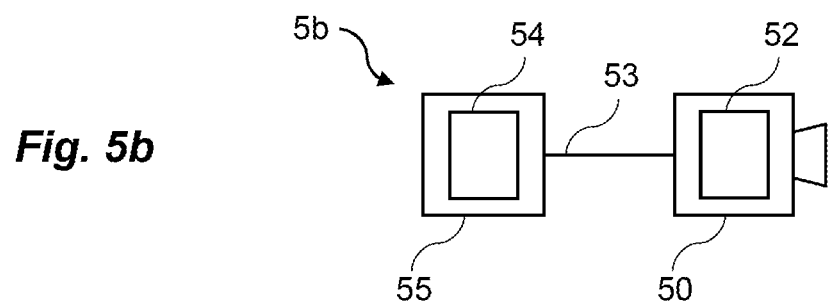
FIG. 5b illustrates a second embodiment of a thermal camera system.

FIGS. 5a and 5b illustrate alternative configurations of a thermal camera system comprising an arrangement for providing a pseudo coloring of a digital single-channel image. The thermal camera systems may be monitoring thermal camera systems.

Starting with FIG. 5a, a thermal camera device 5a is illustrated. The thermal camera device 5a comprises an image acquiring unit 52 and an image processing unit 51 arranged in a single module 50. The image acquiring unit 52 and the image processing unit 51 forms the arrangement for providing a pseudo coloring of a digital single-channel image. The image acquiring unit 52 is connected to the image processing unit 51 by a connection 53. The image acquiring unit 52 may comprise optics and an image sensor, which are both exemplified above. The image processing unit 51 may comprise a pseudo coloring operator which is exemplified above. The image processing unit 51 may thus be arranged to pseudo color an acquired digital single-channel image by forming a first channel of a multi-channel image by performing a first histogram equalization of the intensity distribution, and forming a second channel of the multi-channel image by performing a second, different, histogram equalization of the intensity distribution, wherein the first channel and the second channel of the multi-channel image represent different components of a color model. This process, and modifications thereof, has been explained in detailed in connection to previous figures. Other above disclosed operators/components may also be part of the image processing unit 51, such as a local contrast enhancement algorithm operator, a sharpening operator, and/or a scaler.

In FIG. 5b, a thermal camera device 5b having a modular design is illustrated. The thermal camera device 5b comprises an image acquiring unit 52 with corresponding function as the one disclosed above. The image acquiring unit 52 is arranged in a first module 50 of the thermal camera device 5b. An image processing unit 54 is arranged in a second module 55 of the thermal camera device 5b. The image acquiring unit 52 and the image processing unit 54 forms the arrangement for providing a pseudo coloring of a digital single-channel image. The image processing unit 54 may have the same function as the image processing unit 51 disclosed above, but is located in a different module than the image acquiring unit. A connection 53 connect the image acquiring unit 52 and the image processing unit 54. The connection 53 may be implemented as a wired or wireless connection.

The person skilled in the art realizes that the present invention by no means is limited to the preferred embodiments described above. On the contrary, many modifications and variations are possible within the scope of the appended claims. For example, the image process may comprise less, more or other operators/components than the ones exemplified above. Moreover, the image processing may be performed in a different order than exemplified above. All provided examples should be construed as non-limiting.

What is claimed is:

1. A method for pseudo coloring of a digital single-channel image, the method comprising:
    acquiring a single-channel image having an intensity distribution;
    forming a first channel of a multi-channel image by performing a first histogram equalization of the intensity distribution;
    forming a second channel of the multi-channel image by performing a second, different, histogram equalization of the intensity distribution; and creating the multi-channel image with the formed channels, wherein the first channel and the second channel of the multi-channel image represent different components of a color model.

2. The method according to claim 1, further comprising: forming a third channel of the multi-channel image by performing a third histogram equalization of the intensity distribution.

3. The method according to claim 1, wherein one of the histogram equalizations comprises cutting off a first portion of the intensity distribution, and wherein another one of the histogram equalizations comprises cutting off a second portion of the intensity distribution.

4. The method according to claim 1, wherein at least one of the histogram equalizations comprises cutting off an upper portion or a lower portion of the intensity distribution.

5. The method according to claim 4, wherein the upper portion or the lower portion that is cut off corresponds to 0.5-1% of the total number of pixels in the single-channel image.

6. The method according to claim 1, wherein at least one of the histogram equalizations comprises cutting off an upper portion and a lower portion of the intensity distribution.

7. The method according to claim 6, wherein each of the upper portion and the lower portion corresponds to 1-2% of the total number of pixels in the single-channel image.

8. The method according to claim 1, wherein at least one of the histogram equalizations comprises an adaptive histogram equalization, or a plateau histogram equalization.

9. The method according to claim 1, wherein the color model is one of the RGB color model, the CMYK color model, the HSV color model, and the HSL color model.

10. The method according to claim 1, further comprising reducing the size of each channel of the multi-channel image before transmittal over a network.

11. The method according to claim 1, wherein the single-channel image is a thermal image, a radar image, an X-ray image or an ultrasound image.

12. An arrangement for providing a pseudo coloring of a digital single-channel image, the arrangement comprising:
an image sensor arranged to acquire a single-channel image having an intensity distribution; and
a processor arranged to:
form a first channel of a multi-channel image by performing a first histogram equalization of the intensity distribution; and
form a second channel of the multi-channel image by performing a second, different, histogram equalization of the intensity distribution; and
create the multi-channel image with the formed channels, wherein the first channel and the second channel of the multi-channel image represent different components of a color model.

13. The arrangement according to claim 12, further comprising a scaling unit arranged to reduce the size of each of the channels of the multi-channel image before transmittal over a network.

14. A monitoring thermal camera system comprising an arrangement for providing a pseudo coloring of a digital single-channel image, the arrangement comprising:
an image acquiring unit arranged to acquire a single-channel image having an intensity distribution; and
an image processing unit arranged to:
form a first channel of a multi-channel image by performing a first histogram equalization of the intensity distribution; and
form a second channel of the multi-channel image by performing a second, different, histogram equalization of the intensity distribution; and
create the multi-channel image with the formed channels, wherein the first channel and the second channel of the multi-channel image represent different components of a color model.

* * * * *